No. 808,889. PATENTED JAN. 2, 1906.
C. VON CULIN.
CUTTING GAGE FOR SAW TABLES.
APPLICATION FILED NOV. 12, 1904.
2 SHEETS—SHEET 2.
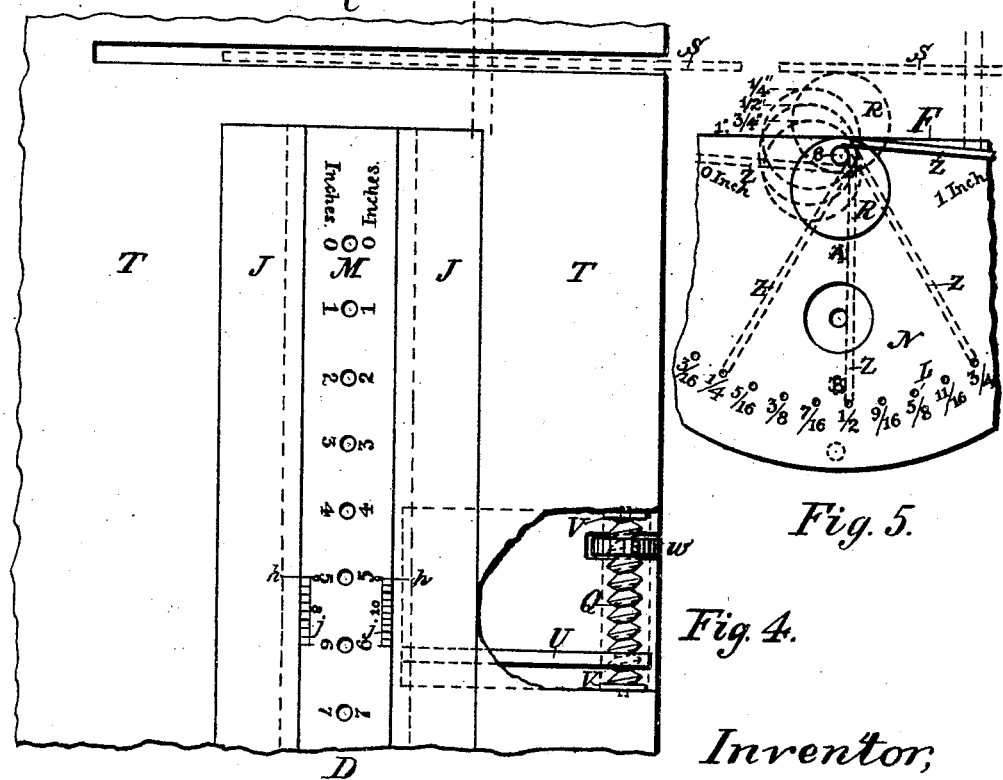

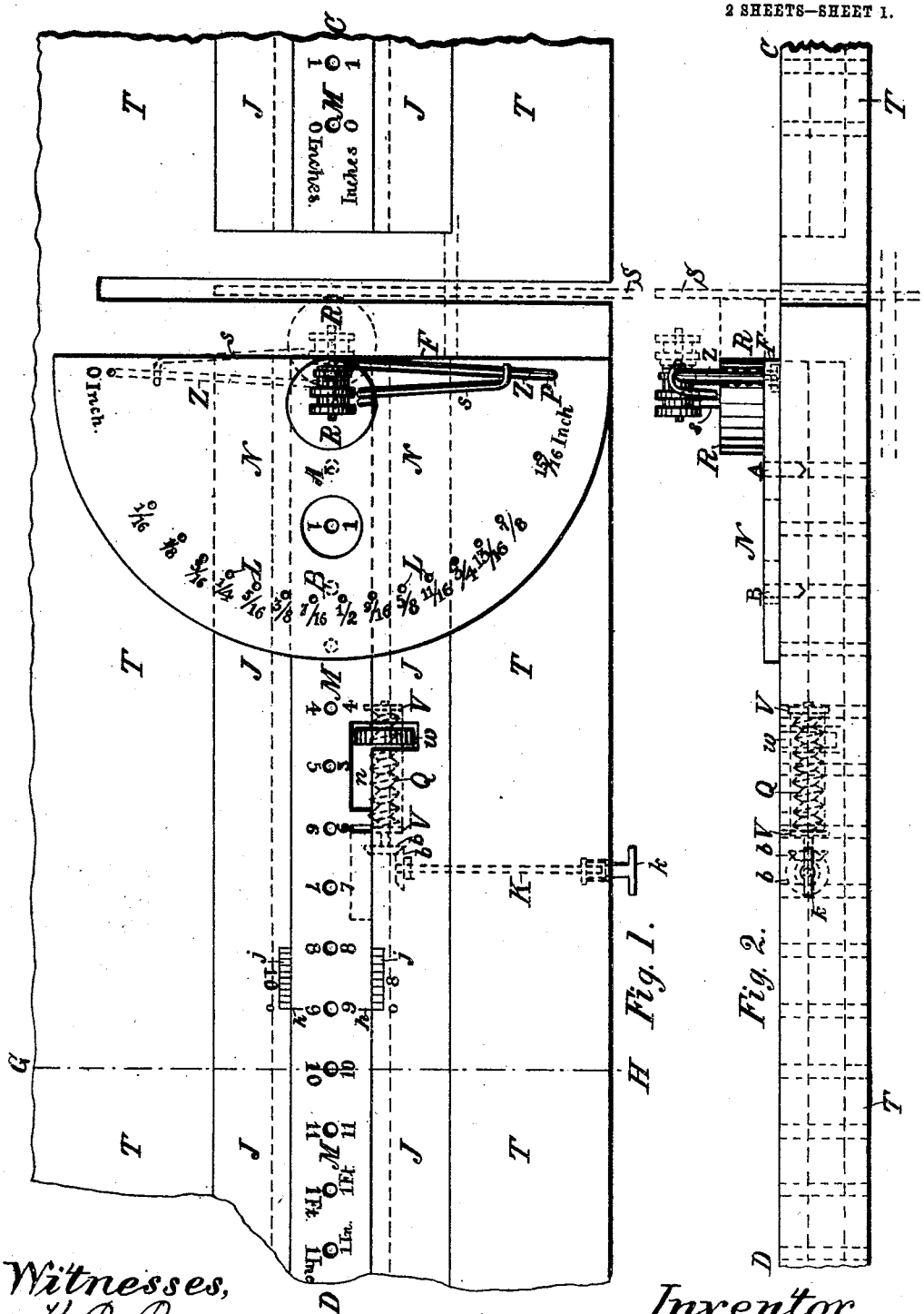

UNITED STATES PATENT OFFICE.

CLAYTON VON CULIN, OF WAYLAND, NEW YORK.

CUTTING-GAGE FOR SAW-TABLES.

No. 808,889.  Specification of Letters Patent.  Patented Jan. 2, 1906.

Application filed November 12, 1904. Serial No. 232,441.

*To all whom it may concern:*

Be it known that I, CLAYTON VON CULIN, a citizen of the United States of America, and a resident of the town of Wayland, in the county of Steuben and State of New York, have invented certain new and useful Improvements in Cutting-Gages for Saw-Tables, of which the following is a specification.

My invention relates to a new and novel form of cutting-gage or adjustable head for saw-tables which may be very rapidly and accurately set to allow for the width of the saw "kerf" or cut made by the saw to allow for different thicknesses of saws and "set" of saw-teeth and also where more than one saw is used and by a separate adjustment to also set the gage to permit any desired lengths, widths, or thicknesses of material to be cut or sawed.

I attain these objects by the mechanism shown in the accompanying drawings, showing my improvements.

Figure 1 shows a plan view of my improvements set on and in the saw-table rail J J, the saw S being indicated by dotted lines. Fig. 2 shows a longitudinal elevation of Fig. 1 looking from H toward G of Fig. 1. Fig. 3 shows a transverse vertical section of Fig. 1 at line G H of Fig. 1 and looking from D toward C of Fig. 1. Fig. 4 shows a plan view of part of the top of a saw-table T fitted with my adjustable graduated rail-slide M with my movable cutting gage or head N R shown in Figs. 1, 2, 3, and 5 removed and with a portion of the top of the saw-table T also removed to show the movable slide M, adjusting mechanism Q U V V w. Fig. 5 shows a plan view of part of one of my movable cutting gages or heads N R, Figs. 1, 2, and 3, showing a diagram of the operation of setting the eccentric head R, arm Z, and index-point P of the gage for any length, width, or thickness to which it is desired to cut or saw material. Fig. 6 shows a transverse vertical section of part of a saw-table T, rail J, and one of my movable graduated slides M of different shape from the movable slide M and rail J shown in Figs. 1 and 3.

Similar letters refer to similar parts in all the views.

My improvement comprises the following principal parts: the slide or base M, graduated in feet and inches, set in the saw-table rail and base J J and having numbered perforations at each graduation one inch apart from center to center and having an index $h$ on its upper edge. This slide M may be moved one inch or any portion of an inch away from or toward the saw S by a screw Q, threaded or geared into a part of the slide M, as shown in Figs. 1, 2, and 3, or into an arm U, attached to the slide M, as shown in Fig. 4, the screw Q being supported by bearings V V, carried by the stationary rail J or saw-table T. This screw Q has a thumb-wheel $w$ keyed on it and set with its upper or outer circumference nearly up to the top of the rail J or nearly even with the outer edge of the table T. The screw Q may also have keyed on one end a bevel or miter wheel $b$, gearing into another bevel or miter wheel $b$, keyed on a shaft K, extending to the side of the table T and actuated by a hand-wheel or movable key $k$. This slide M, as shown in Figs. 1, 2, and 3, is slotted at $n$ to permit the use of the thumb-wheel $w$; but in Fig. 4 a slot is not needed, as I have shown an arm U extending from the slide M in a recess in the rail J and table T and having the screw Q and thumb-wheel $w$ placed in the recess in the side of the table T and supported by the bearings V V, the screw Q being threaded through the arm U, so that the slide M can be operated from the side of the saw-table T by the thumb-wheel $w$. In Figs. 1, 2, and 3 I have shown a beveled slide M, and in Fig. 6 a tongued-and-grooved slide M in the rail J J. The numbered perforations for the insertion of the spacing-pins A B of the graduated plate N (shown at A B, "0, 1, 2, 3, 4, 5, 6, 7, 8, 9, 10, 11, 12, 1 Ft., 1 In." in Fig. 1; by pairs of dotted lines at A B, &c., in Fig. 2, and at "0, 1, 2, 3, 4, 5, 6, 7" in Fig. 4 in the graduated slide M) are continued through the saw-table rail J J and through the bottom of the saw-table T to prevent any dust or sawdust from accumulating in or filling up the holes at A B "0," "1," "2," &c., in the slide M and allow it to pass from them down through the holes in the saw-table rail J J and saw-table T. This it may do freely when the holes in the slide M, saw-table rail J J, and saw-table T coincide or register. At other times when they do not register the dust from the holes in the slide M can pass through the groove or space in or under the slide M (shown in Figs. 3 and 6) to the nearest holes in the saw-table rail J J and the saw-table T, and so escape. Without these holes in the saw-table rail J J and saw-table T and without the groove or space in or under the slide M the holes in the said slide will be liable to be filled up with dust and prevent the proper placing of the pins A B of the graduated plate N and also impede the sliding of the slide M.

The upper portion of my improvement is a graduated plate N, Figs. 1, 2, 3, and 5, having on its under side two spacing-pins A and B placed one or more inches apart center to center, in this case supposed to be two inches apart. This plate N carries on its upper surface a rotating circular head R, having a pivot e, about which it rotates, placed eccentrically near one side of the circular head R. This pivot e is placed near the straight edge F of the plate N and in the center of the arc of semicircular graduations and index-point depressions or holes L L on the upper surface of the plate N. This head R carries an arm Z with an index-point P, which arm Z is pivoted to head R to swing in a vertical plane and held in engagement with holes L by means of spring s to permit the arm Z to be raised and moved to any desired graduation and to keep the arm Z and point P where placed until a new adjustment is made.

The operation of my improvement is as follows: The slide M is set with its index h at "0" of the scales j j, Figs. 1 and 4. The movable gage-plate or head N is then set on the slide M, with its spacing-pin A in the hole "0" and the spacing-pin B in the hole "2" in the slide M. The circular eccentric head R is set with its arm Z and the index-point P in the hole marked "1 inch" in the plate N. The slide M is then moved by revolving the thumb-wheel w or hand-wheel or key k, Figs. 1, 2, 3, and 4, until the circular eccentric head R is in contact with the saw-teeth of the saw S to allow for width of the saw kerf or cut. At this time the circular eccentric head R has reached its maximum "throw," its extreme circumference being one inch to the face F of the plate N. The arm Z is then moved to the fraction-of-an-inch dimension to which it is desired to cut the material on the scale on the dial or plate N. I have shown it in Fig. 5 set at "0," at "¼ inch," at "½ inch," at "¾ inch," and at "1 inch;" but any other divisions to which the dial N may be graduated may be used. After the circular eccentric head R is set at the fraction of an inch desired, if the material is to be cut one inch or less the movable plate N is allowed to remain with the spacing-pin A in the hole "0" in the slide M; but if the material is to be cut to any greater length than one inch the movable head or plate N is moved so that its spacing-pin A will be in the hole in the slide M indicating that length. For instance, after the saw-kerf adjustment is made by moving the slide M as above described if the material is to be cut ten and one-fourth inches in length the circular eccentric head R is set at "¼ inch." The plate N is then placed with its spacing-pin A in the hole marked "10 inches" in the slide M, its spacing-pin B being placed in the hole marked "1 Ft.," as the spacing-pins A and B in this example are placed two inches apart center to center. In Figs. 1 and 5 I have shown graduations on the dial or plate N spaced one-sixteenth of an inch apart; but it may be divided into any other convenient fractional parts of an inch. I have shown the scales j j on the saw-table rails J J, Fig. 1, and on the slide M, Fig. 4, divided into eighths and tenths of an inch; but any other desired scales may be substituted. If the scale is on the rail J, the index h is placed on the slide M, or vice versa.

In the drawings I have shown the scales divided into English feet, inches, and fractions; but metrical graduations may be used, in which case the holes in the slide M may be placed twenty-five centimeters apart from center to center and the semicircular scale on the dial or plate N graduated to twenty-five parts or centimeters or finer divisions, if desired, the circular eccentric head R in this case having a maximum eccentric throw of twenty-five centimeters. This will necessitate the spacing-pins A and B being placed twenty-five centimeters or multiples of that distance apart to correspond with the distances apart of the holes in the slide M. The scales j j would also be divided into centimeters or fractions thereof.

In Fig. 1 the movable cutting-gage head N R is shown on the side D of the saw S; but it may be reversed and placed on the other side C of the saw S.

What I claim as my invention, and desire to secure by Letters Patent, is—

The combination with a saw-table and a rail therein having slideways, of a saw-table gage having a base or slide adapted to engage and slide in said ways the said base and rail having each a series of perforations adapted for interchangeable registration and means for engagement therewith to secure adjustment of the gage and means for adjusting said slide so that the perforations in the slide-rail may not always register, the said base or slide having a close fit as to its lateral edges with said way but providing a longitudinal space beneath its bottom surface and the bottom of said slideway and perforations in the rail carried through the table, so that dust sifting through the perforations in the slide if carried by the slide in its adjustment which might otherwise clog in the slide will not prevent free sliding motion of the slide and may in such manner be permitted to escape through non-registering perforations in the bottom of the slideway.

Signed at Wayland, New York, this 12th day of August, 1904.

CLAYTON VON CULIN. [L. S.]

Witnesses:
  EMMA P. BEALS,
  HIRAM C. BRIGGS.